US010821918B2

United States Patent
Uematsu et al.

(10) Patent No.: US 10,821,918 B2
(45) Date of Patent: Nov. 3, 2020

(54) PROTECTOR AND WIRE HARNESS

(71) Applicant: Yazaki Corporation, Tokyo (JP)

(72) Inventors: Satoshi Uematsu, Shizuoka (JP); Kohji Miyakoshi, Shizuoka (JP); Hidetoshi Satoh, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 71 days.

(21) Appl. No.: 15/878,296

(22) Filed: Jan. 23, 2018

(65) Prior Publication Data
US 2018/0208134 A1  Jul. 26, 2018

(30) Foreign Application Priority Data

Jan. 25, 2017 (JP) .................................. 2017-011637

(51) Int. Cl.
*B60R 16/02* (2006.01)
*H02G 7/10* (2006.01)
*H02G 3/04* (2006.01)

(52) U.S. Cl.
CPC ......... *B60R 16/0215* (2013.01); *H02G 3/045* (2013.01); *H02G 7/10* (2013.01)

(58) Field of Classification Search
CPC ................................. H02G 7/10; H02G 3/045
See application file for complete search history.

(56) References Cited

U.S. PATENT DOCUMENTS

| | | | | |
|---|---|---|---|---|
| 5,401,905 A | * | 3/1995 | Lesser | H02G 3/26 138/108 |
| 5,886,295 A | * | 3/1999 | Carino | H02G 3/288 174/481 |
| 7,390,967 B2 | * | 6/2008 | Daito | H02G 3/32 174/72 A |
| 8,188,368 B2 | * | 5/2012 | Suzuki | B60R 16/0215 174/101 |
| 9,343,889 B2 | * | 5/2016 | Sato | H02G 15/007 |
| 2007/0187144 A1 | * | 8/2007 | Kato | B60R 16/0215 174/72 A |
| 2009/0050350 A1 | * | 2/2009 | Katsumata | H02G 3/0468 174/135 |
| 2012/0266415 A1 | * | 10/2012 | Takeuchi | B60R 16/0215 24/27 |

(Continued)

FOREIGN PATENT DOCUMENTS

JP       5939400 B2    6/2016

*Primary Examiner* — Paresh H Paghadal
(74) *Attorney, Agent, or Firm* — Kenealy Vaidya LLP (57) ABSTRACT

A protector includes a bottom plate, a pair of side walls, and an inner space in which a plurality of routing members are routed. One of the side walls has first and second through-holes into which a binding member that fastens a routing member bundle to the one side wall is inserted. The first through-hole is continuously formed with a bottom surface of the bottom plate, close to the inner space. The second through-hole is formed to be spaced apart from the first through-hole in a standing direction. When seen in a run-through direction of the first through-hole, the bottom plate includes a pair of protruding portions that are spaced apart in an extending direction with the first through-hole interposed therebetween. The pair of protruding portions are formed, on the bottom surface, close to the one side wall in the run-through direction.

7 Claims, 5 Drawing Sheets

(56) References Cited

U.S. PATENT DOCUMENTS

| | | | |
|---|---|---|---|
| 2012/0298404 A1* | 11/2012 | Tokunaga | B60R 16/0215 174/135 |
| 2013/0228367 A1* | 9/2013 | Sato | B60R 16/0215 174/480 |
| 2016/0284440 A1* | 9/2016 | Adachi | H02G 3/0691 |
| 2017/0267191 A1* | 9/2017 | Chambosse | B60R 16/0215 |

* cited by examiner

PROTECTOR AND WIRE HARNESS

CROSS-REFERENCE TO RELATED APPLICATION(S)

The present application claims priority to and incorporates by reference the entire contents of Japanese Patent Application No. 2017-011637 filed in Japan on Jan. 25, 2017.

BACKGROUND OF THE INVENTION

1. Field of the Invention

The present invention relates to a protector and a wire harness.

2. Description of the Related Art

Binding members such as cable ties are used in wire harnesses installed in vehicles and so on to fasten wires or cables routed in an inner space of a protector included in the wire harnesses to the protector. The binding members are used to fasten a bundle of a plurality of routing members to the protector with the bundle being in position in the inner space of the protector (see, for example, Japanese Patent No. 5939400).

To fasten a routing member bundle by a binding member, the binding member is arranged to surround the routing member bundle. In this case, it is difficult to place the binding member below a plurality of routing members that have been routed in the inner space of the protector. Thus, the binding member is arranged along outer surfaces of a side wall and a bottom plate that partly define the inner space of the protector, that is, arranged along an outer circumferential surface of the protector, and the binding member is configured to fasten the routing members with part of the protector interposed between the binding member and the routing members. However, in this structure, a large part of the binding member is disposed outside the circumferential surface of the protector. This configuration makes it difficult to reduce a size of the protector with routing members routed therein.

SUMMARY OF THE INVENTION

The present invention has been made in view of the foregoing, and it is an object of the present invention to provide a protector and a wire harness that allow a part of a plurality of routing members to be fastened with the part of the routing members being in position, and that can achieve miniaturization of the protector with the routing members routed therein.

In order to achieve the above mentioned object, a protector according to one aspect of the present invention includes a bottom plate, a pair of side walls that stand on the bottom plate, and an inner space that is defined by at least the bottom plate and the pair of side walls, and in which a plurality of routing members are routed, wherein one side wall of the pair of side walls has a first through-hole and a second through-hole that run through the side wall from an outside to the inner space, and into the first and second through-holes a binding member that fastens at least a part of the routing members to the side wall is inserted, the first through-hole is continuously formed with a bottom surface of the bottom plate, close to the inner space, the second through-hole is formed to be spaced apart from the first through-hole in a standing direction, the bottom plate includes a pair of protruding portions formed to protrude in the standing direction from the bottom surface, the pair of protruding portions, when seen in a run-through direction of the first through-hole, being spaced apart in a direction orthogonal to the standing direction and the run-through direction with the first through-hole interposed between the pair of protruding portions, and the pair of protruding portions are formed, on the bottom surface, close to the one side wall in the run-through direction.

According to another aspect of the present invention, in the protector, the pair of protruding portions may have each a first end portion located in the run-through direction and a second end portion located in a direction opposite to the run-through direction, the first end portion may be configured to protrude beyond the second end portion in the standing direction, and the second end portion may be connected to the one side wall.

According to still another aspect of the present invention, in the protector, the bottom plate may include a connecting portion provided to protrude from the bottom surface in the standing direction, the connecting portion may connect the first end portions of the pair of protruding portions located in the run-through direction, and the bottom surface may have a guiding inner surface between the pair of protruding portions, and the guiding inner surface may be configured to protrude in the standing direction toward the run-through direction.

According to still another aspect of the present invention, in the protector, when seen in the direction orthogonal to the standing direction and the run-through direction, the pair of protruding portions each may include an end portion located in the standing direction having a curved shape curving in a direction opposite to the standing direction.

A wire harness according to still another aspect of the present invention includes a plurality of routing members, and a protector including a bottom plate, a pair of side walls standing on the bottom plate, and an inner space defined by at least the bottom plate and the pair of side walls, and in which the routing members are routed, wherein in the protector, one side wall of the pair of side walls has a first through-hole and a second through-hole that run through the side wall from outside to the inner space, and into the first and the second through-holes a binding member that fastens at least a part of the routing members to the side wall is inserted, the first through-hole is continuously formed with a bottom surface of the bottom plate, close to the inner space, the second through-hole is formed to be spaced apart from the first through-hole in a standing direction, and the bottom plate includes a pair of protruding portions formed to protrude in the standing direction from the bottom surface, the pair of protruding portions, when seen in a run-through direction of the first through-hole, being spaced apart in a direction orthogonal to the standing direction and the run-through direction with the first through-hole interposed between the pair of protruding portions.

The above and other objects, features, advantages and technical and industrial significance of this invention will be better understood by reading the following detailed description of presently preferred embodiment of the invention, when considered in connection with the accompanying drawings.

DETAILED DESCRIPTION OF THE PREFERRED EMBODIMENT

The following details an embodiment of the present invention with reference to the accompanying drawings. The embodiment is not intended to limit the scope of the present invention. Components of the embodiment to be described below include components that can be easily replaced by the skilled person or components that are substantially the same.

EMBODIMENT

Figure 1:
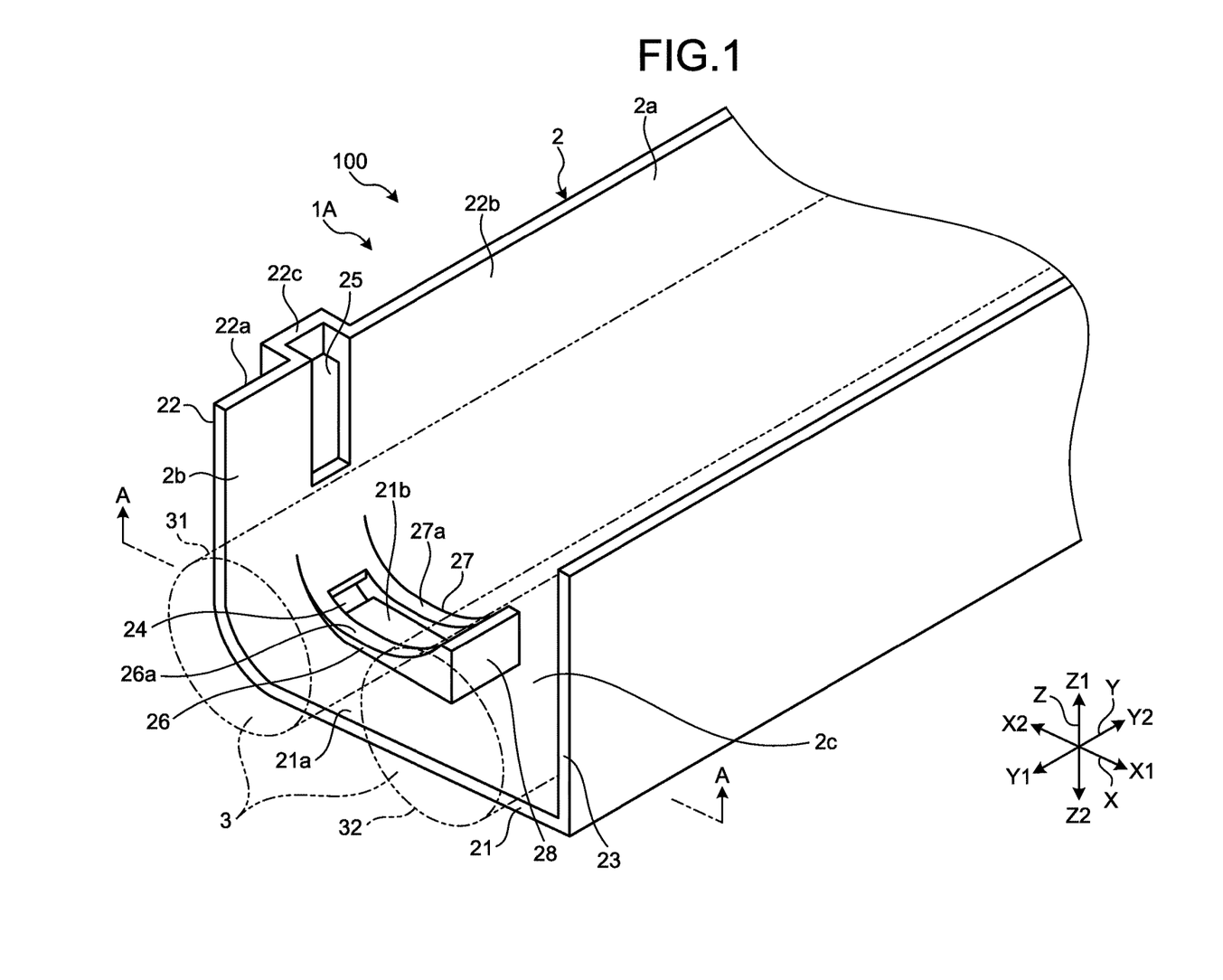
FIG. 1 is a perspective view illustrating a protector of a wire harness according to an embodiment of the present invention.
Figure 2:
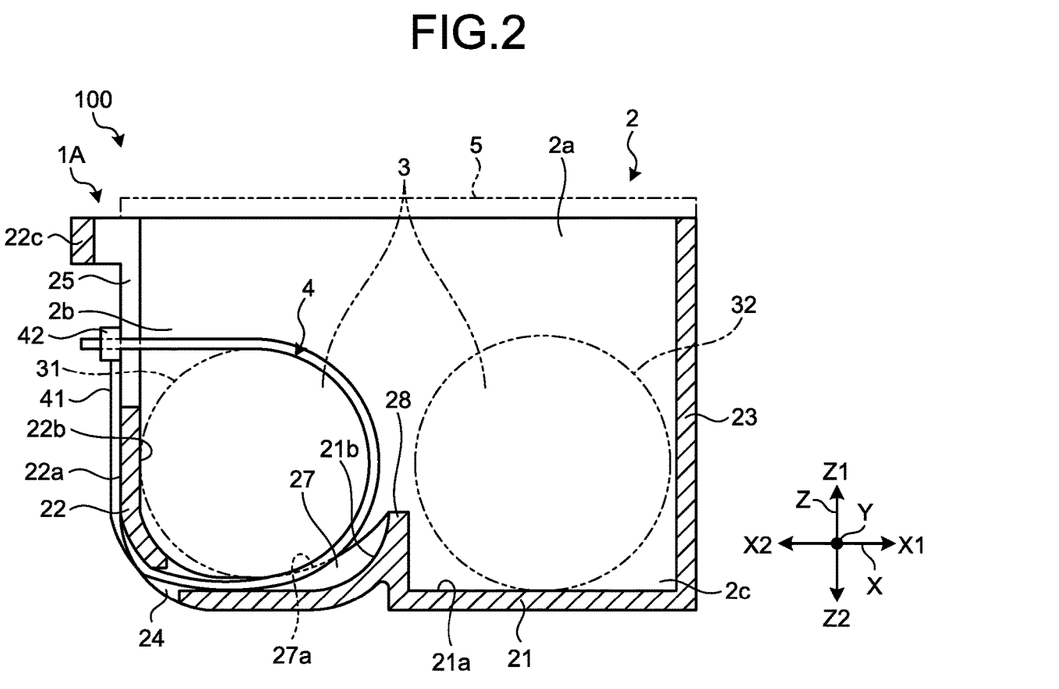
FIG. 2 is a cross-sectional view illustrating the protector of the wire harness according to the embodiment.
Figure 3:
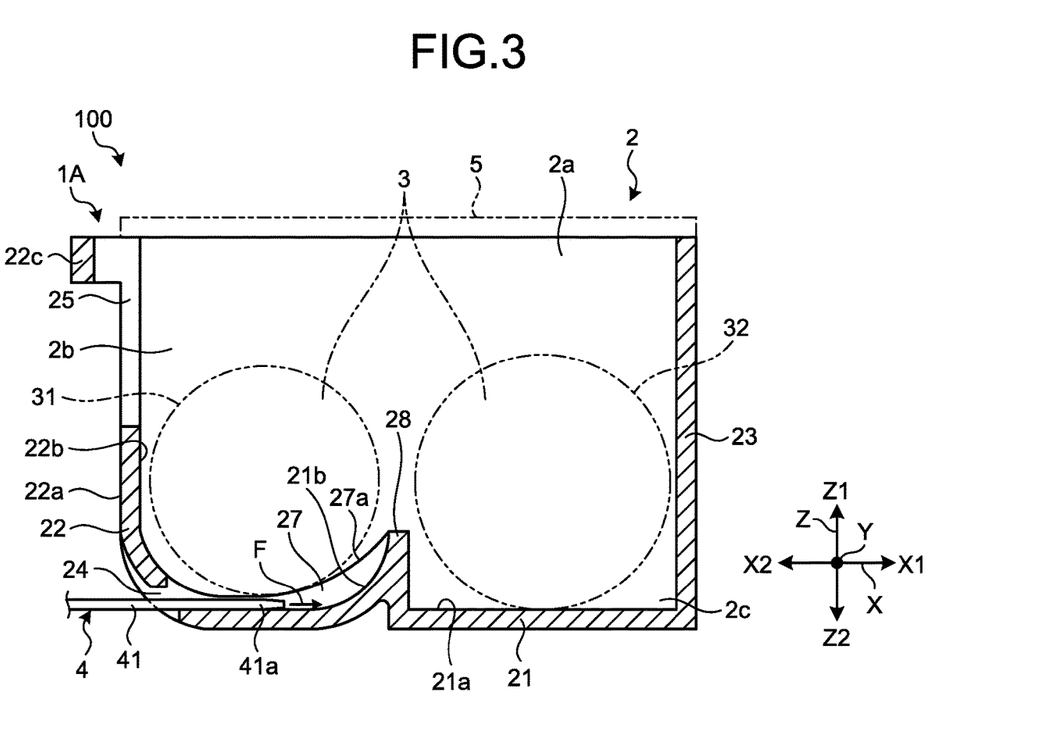
FIG. 3 is an explanatory view illustrating how a binding member according to the embodiment is arranged.

A protector according to an embodiment of the present invention will be described. FIG. 1 is a perspective view illustrating the protector of a wire harness according to the embodiment. FIG. 2 is a cross-sectional view illustrating the protector of the wire harness according to the embodiment. FIG. 3 is an explanatory view illustrating how a binding member according to the embodiment is arranged. FIG. 1 (as well as FIGS. 5 and 6) is a full perspective view without illustrating the binding member, and FIG. 2 is a cross-sectional view taken along line A-A in FIG. 1. Here, an X direction in the drawings corresponds to a width direction of the protector according to the present embodiment, and X1 indicates a run-through direction and X2 indicates a counter-run-through direction that is opposite to the run-through direction. A Y direction corresponds to a direction in which the protector according to the present embodiment extends, and is a direction in which routing members are routed in the protector. Here, the direction is orthogonal to the width direction. Y1 indicates a front direction and Y2 indicates a back direction. A Z direction corresponds to an up-and-down direction of the protector that is orthogonal to the width direction and a depth direction of the protector. Z1 indicates an upward direction that corresponds to a standing direction, and Z2 indicates a downward direction that is opposite to the standing direction.

A protector 1A according to the present embodiment is installed in a vehicle such as an automobile to protect a plurality of conductive routing members 3 from an external force. The routing members 3 transmit electric power supplied from a power source such as a battery to various electronic components. The protector 1A includes an inner space 2a in which the routing members 3 are routed. As illustrated in FIG. 1, the protector 1A is included in a wire harness 100 and is used to gather the routing members 3 together and accommodate them therein. The protector 1A according to the present embodiment is disposed in a space in the vehicle such as an engine compartment, a trunk compartment, or a vehicle cabin and is located between the power source such as a battery and various electronic components installed in the vehicle. In some cases, the protector 1A is installed in a space of the vehicle with its up-and-down direction aligning with the vertical direction, whereas in other cases, the protector 1A is installed in a space of the vehicle with its up-and-down direction crossing the vertical direction. As illustrated in FIGS. 1 and 2, the protector 1A includes a housing 2, a plurality of routing members 3, a binding member 4, and a lid 5.

The housing 2 defines the inner space 2a of the protector 1A in which the routing members 3 are routed. The housing 2 includes a bottom plate 21, a pair of side walls 22 and 23, a first through-hole 24, a second through-hole 25, a pair of protruding portions 26 and 27, and a connecting portion 28. The housing 2 is made of an insulating synthetic resin, and these components 21 to 28 of the housing 2 are integrally formed.

The bottom plate 21 partly defines the inner space 2a and has a flat plate shape. When seen in the up-and-down direction, the bottom plate 21 according to the present embodiment has a rectangular shape with the longitudinal direction corresponding to the extending direction.

The pair of side walls 22 and 23 partly define the inner space 2a and each have a flat plate shape. The pair of side walls 22 and 23 according to the present embodiment are disposed at respective ends of the bottom plate 21 in the width direction and stand thereon, that is, protrude upward. When seen in the width direction, the pair of side walls 22 and 23 each have a rectangular shape with the longitudinal direction corresponding to the extending direction. The housing 2, which is configured by the bottom plate 21 and the pair of side walls 22 and 23, has a U-shape when seen in the extending direction. The housing 2 is in communication with an outside through respective ends of the housing 2 in the extending direction and an upper end portion thereof. The inner space 2a is defined by at least the bottom plate 21 and the pair of side walls 22 and 23.

The first through-hole 24 runs through the protector 1A from an outside to the inner space 2a, and a main section 41 of the binding member 4 to be described later is inserted into the first through-hole 24 from an outside of the protector 1A to the inner space 2a. The first through-hole 24 according to the present embodiment is formed in the one side wall 22 of the pair of the side walls 22 and 23. In other words, the first through-hole 24 is formed through the side wall 22 from an outer surface 22a to an inner surface 22b in the width direction. The first through-hole 24 is continuously formed with an inner surface 21a of the bottom plate 21 close to the inner space 2a. In other words, when seen in the counter-run-through direction, the first through-hole 24 is formed such that a lower end portion of an opening of the first through-hole 24 on the inner surface 22b is in a part of the inner surface 21a. The first through-hole 24 formed in the side wall 22 has a dimension in the extending direction greater than the width of the main section 41 of the binding member 4.

The second through-hole 25 runs through the protector 1A from the outside to the inner space 2a, and the main section 41 of the binding member 4 to be described later that is inserted through the first through-hole 24 is then inserted into the second through-hole 25 from the inner space 2a to the outside of the protector 1A. The second through-hole 25 according to the present embodiment is formed in the side wall 22 of the pair of side walls 22 and 23, and is formed to be spaced apart from the first through-hole 24 in the up-and-down direction. The second through-hole 25 is located at an upper position relative to the first through-hole 24. In other words, the second through-hole 25 is formed through the side wall 22 from the outer surface 22a to the inner surface 22b in the width direction. The second through-hole 25 formed in the side wall 22 has a dimension in the extending direction greater than the width of the main section 41 of the binding member 4. The side wall 22 is provided with a rib 22c at an upper end portion of the second through-hole 25.

Even when the plurality of routing members 3 are routed in the inner space 2a, the pair of protruding portions 26 and 27 allow the main section 41 of the binding member 4 to be located below a routing member bundle 31 to be described later that corresponds to some of the routing members 3 to be fastened by the binding member 4. The pair of protruding portions 26 and 27 protrude upward from the inner surface 21a of the bottom plate 21. When seen in the run-through direction of the first through-hole 24, the pair of protruding portions 26 and 27 are arranged in the extending direction, that is, in a direction orthogonal to the standing direction and the run-through direction with the first through-hole 24 interposed therebetween. The pair of protruding portions 26 and 27 according to the present embodiment formed on the bottom plate 21 are spaced apart in the extending direction by a distance greater than the width of the main section 41 of the binding member 4. The pair of protruding portions 26 and 27 are located, on the inner surface 21a, close to the side wall 22 in the run-through direction (width direction). In other words, when supposing that the inner surface 21a is divided into two sections with respect to the center of the inner surface 21a in the width direction, one of which is close to the side wall 22 and the other one of which is close to the side wall 23, the pair of protruding portions 26 and 27 are located in the section close to the side wall 22. The pair of protruding portions 26 and 27 according to the present embodiment are disposed on the inner surface 21a close to the first through-hole 24, and end portions of the pair of protruding portions 26 and 27 located in the run-through direction are located close to the side wall 22 relative to the center of the inner surface 21a in the width direction. Even when the routing member bundle 31 to be fastened by the binding member 4 has a predetermined minimum outer diameter, the pair of protruding portions 26 and 27 are formed such that the lower end portion of the routing member bundle 31 is allowed to be in contact with upper end portions 26a and 27a before the routing member bundle 31 is fastened by the binding member 4.

The pair of protruding portions 26 and 27 each have a first end portion located in the run-through direction and a second end portion located in a direction opposite to the run-through direction, that is, the counter-run-through direction, and the first end portion protrudes upward beyond the second end portion in the standing direction. The pair of protruding portions 26 and 27 are formed such that portions between the first end portions and the second end portions do not protrude beyond the first end portions. The second end portions of the pair of protruding portions 26 and 27 located in the counter-run-through direction are connected to the side wall 22. In other words, the pair of protruding portions 26 and 27 are continuous with the inner surface 22b of the side wall 22 and protruded upward from the inner surface 21a of the bottom plate 21 with the first end portions located in the run-through direction being the highest protruding portions.

When seen in the extending direction, that is, seen in the direction orthogonal to the standing direction and the run-through direction, the upper end portions 26a and 27a that are end portions of the pair of protruding portions 26 and 27 in the upward direction have a curved shape curving downward, that is, curving in the direction opposite to the standing direction. In the present embodiment, the curved shape of the upper end portions 26a and 27a is configured by a line segment extending in the width direction, a first arc extending from an end of the line segment in the counter-run-through direction of the width direction to the second end portion of the pair of protruding portions 26 and 27, and a second arc having a greater curvature than that of the first arc and extending from the other end of the line segment in the run-through direction to the first end portion of the pair of protruding portions 26 and 27. The curved shape needs only be curved downward, and may be configured by a plurality of line segments or a plurality of arcs, or may be configured by a single arc.

The connecting portion 28 connects the pair of protruding portions 26 and 27. The connecting portion 28 protrudes upward from the inner surface 21a and connects, in the extending direction, the first end portions of the pair of protruding portions 26 and 27 located in the run-through direction. The inner surface 21a has a guiding inner surface 21b between the pair of protruding portions 26 and 27, and the guiding inner surface 21b is raised upward at the connecting portion 28. A portion of the guiding inner surface 21b located in the counter-run-through direction is flush with the inner surface 21a around the guiding inner surface 21b, and a portion of the guiding inner surface 21b located in the run-through direction protrudes upward, and thus, the guiding inner surface 21b itself is raised upward toward the run-through direction, when seen in the extending direction, the portion of the guiding inner surface 21b located in the run-through direction has a curved shape configured by a single arc.

The routing members 3 are routed in the inner space 2a of the protector 1A. The routing members 3 electrically connect electronic components that are connected, for example, at respective ends of wires such as a signal line and a power line, and are each configured by at least one conductor and an insulating sheath that covers the conductor. The routing members 3 according to the present embodiment are bifurcated into two routing member bundles 31 and 32 at the front end of the protector 1A and are exposed to the outside of the protector 1A. It is preferred that the routing member bundles 31 and 32 are each in the form of a bundle in the inner space 2a. For example, the routing members 3 in the inner space 2a are bundled beforehand as the routing member bundles 31 and 32 by using, for example, binding tapes. The routing members 3 of the routing member bundle 31 are electrically connected to distant electronic components located in the frontward direction of the protector 1A. The routing members 3 of the routing member bundle 32 are electrically connected to proximal electronic components, such as an electronic control unit (ECU), located in the front direction of the protector 1A. The routing members 3 are not limited to electrical wires, but may be tubes through which liquid or gas flows, or may be optical cables.

The binding member 4 fastens, to the side wall 22, the routing member bundle 31 that corresponds to at least a part of the routing members 3. The binding member 4 is a flexible member such as a cable tie or band made of synthetic resin, and has a main section 41 and a locking section 42. The main section 41 is an elongated strap shape and an end thereof is connected to the locking section 42. The other end of the main section 41, that is, a pointed tip 41a becomes a tapered shape. When the main section 41 is inserted through the locking section 42, the locking section 42 prevents the main section 41 from being pulled back in a removal direction that is opposite to the direction in which the main section 41 is inserted. The binding member 4 is not limited to a cable tie, and may be a binding tape having a surface, out of two opposite tape surfaces, to which adhesive is applied, or a hook-and-loop fastener having a linear strip shape with two opposite surfaces, one of which has a plurality of tiny hooks and the other one of which has a plurality of smaller loops.

The lid 5 is provided to close the inner space 2a. The lid 5 is disposed at the upper end portion of the housing 2 to close the upper end portion through which the housing 2 is in communication with the outside. The lid 5 is releasably locked to the housing 2 by a locking mechanism, which is not illustrated.

Next, the following is a description as to how the routing member bundle 31 is fastened to the protector 1A by the binding member 4. FIG. 3 is an explanatory view illustrating how the binding member according to the embodiment is arranged. First, as illustrated in FIG. 3, a worker routes a plurality of routing members 3 into the inner space 2a of the protector 1A. In this routing operation, the routing members 3 are separated into the routing member bundles 31 and 32, and the routing member bundles 31 and 32 are disposed, respectively, in spaces 2b and 2c of the inner space 2a. Here, the routing bundle 31 is disposed close to the side wall 22 and the routing bundle 32 is disposed close to the side wall 23, for example. The lower end portion of the routing member bundle 31 is in contact with the upper end portions 26a and 27a of the pair of protruding portions 26 and 27, and a part of the routing member bundle 31 is placed on the pair of protruding portions 26 and 27. The worker then inserts the main section 41 of the binding member 4 into the first through-hole 24. In this case, the worker inserts the pointed tip 41a of the main section 41 into the first through-hole 24 in the run-through direction. The worker further inserts the main section 41 of the binding member 4 through the first through-hole 24. Here, a gap is formed between the lower end portion of the routing member bundle 31 that is in contact with the upper end portions 26a and 27a and the guiding inner surface 21b. The pointed tip 41a moved along the guiding inner surface 21b passes through the gap between the lower end portion of the routing member bundle 31 and the guiding inner surface 21b as indicated by the arrow F in FIG. 3. The portion of the guiding inner surface 21b located in the run-through direction protrudes upward, and this protruding portion changes the direction of the pointed tip 41a moving along the guiding inner surface 21b from the run-through direction to the upward direction. The pointed tip 41a of the main section 41 sticks out from the guiding inner surface 21b in the run-through, upward direction.

The worker then holds the main section 41 stuck out from the guiding inner surface 21b and pulls it upward and around an outer circumference of the routing member bundle 31, and then moves the main section 41 in the counter-run-through direction to insert it into the second through-hole 25. The worker inserts the pointed tip 41a of the main section 41 into the second through-hole 25 in the counter-run-through direction. The worker then inserts the main section 41 into the locking section 42 located outside the protector 1A. The worker keeps the locking section 42 below the rib 22c at the second through-hole 25, and inserts the pointed tip 41a into the locking section 42. The worker then holds the main section 41 stuck out from a side of the locking section 42 opposite to the side from which the main section 41 is inserted, and pulls the main section 41 through the locking section 42 until the outer circumference of the routing member bundle 31 comes in contact with the inner surface 22b of the side wall 22. The locking section 42 prevents the main section 41 from being pulled back in the removal direction, and the binding member 4 fastens the routing member bundle 31 to the protector 1A with the routing member bundle 31 being in contact with the side wall 22, that is, being spaced apart from the routing member bundle 32 in the width direction. The worker then cuts a portion of the pointed tip 41a stuck out from the locking section 42 and locks the lid 5 to the housing 2.

In the protector 1A according to the present embodiment, as described above, the routing member bundle 31 that corresponds to a part of the routing members 3 is placed on the pair of protruding portions 26 and 27 before being tied up by the binding member 4. This configuration creates a gap between the lower end portion of the routing member bundle 31 and the guiding inner surface 21b in the up-and-down direction. The main section 41 of the binding member 4 inserted through the first through-hole 24 in the run-through direction can pass through the gap between the lower end portion of the routing member bundle 31 and the guiding inner surface 21b. With this configuration, the main section 41 of the binding member 4 can easily be arranged around the outer circumference of the routing member bundle 31 and the routing member bundle 31 can be fastened to the protector 1A while in contact with the side wall 22, that is, while in position. The binding member 4 is not disposed outside the bottom plate 21 and thus the protector 1A can have a smaller configuration with the routing members 3 routed therein. The binding member 4 can fasten the routing member bundle 31 to the protector 1A with the routing member bundle 31 being in contact with the side wall 22, in other words, being spaced apart from the routing member bundle 32 in the width direction. This configuration facilitates connecting the routing member bundles 31 and 32 to corresponding electronic components, in particular, facilitates connecting the routing member bundle 32 to a target electronic component that is located near the protector 1A.

Figure 4:
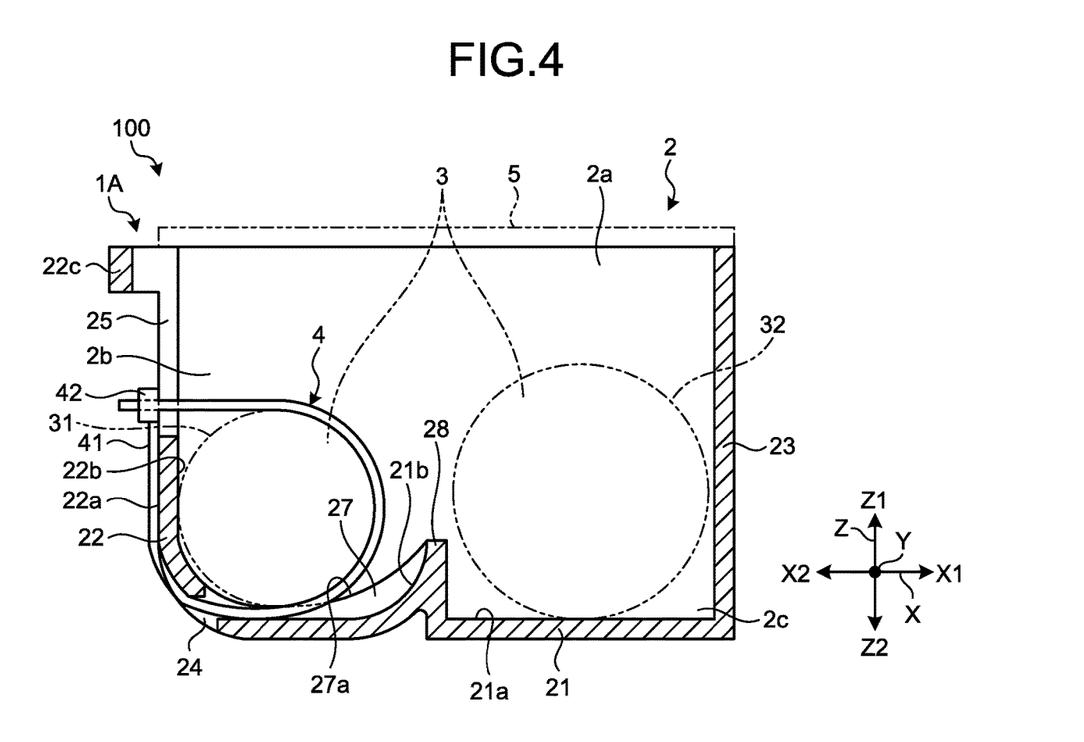
FIG. 4 is an explanatory view illustrating a case in which a different routing member bundle is fastened to the protector of the wire harness according to the embodiment.

The outer diameter of the routing member bundle 31 may vary depending on, for example, the type of a vehicle on which the protector 1A is installed. FIG. 4 is an explanatory view illustrating a case in which a different routing member bundle is fastened to the protector of the wire harness according to the embodiment. Even when the routing member bundle 31 has a smaller outer diameter, for example, has a predetermined minimum outer diameter as illustrated in FIG. 4, the lower end portion of the routing member bundle 31 is placed on the pair of protruding portions 26 and 27, and the lower end portion of the routing member bundle 31 can be spaced apart from the guiding inner surface 21b in the up-and-down direction. With this configuration, the part of the routing members 3 can be fastened while putting it in position, irrespective of the outer diameter of the routing member bundle 31 or, for example, irrespective of the number of routing members 3 that constitute the routing member bundle 31, and the protector 1A can have a smaller configuration with the routing members 3 routed therein.

In the embodiment above, the first end portions of the pair of protruding portions 26 and 27 located in the run-through direction protrude upward beyond the second end portions located in the counter-run-through direction, and the second end portions are connected to the side wall 22. The routing member bundle 31 is placed on the pair of protruding portions 26 and 27 and is shifted in the width direction before being fastened by the binding member 4. This configuration can prevent the routing member bundle 31 from falling down from the pair of protruding portions 26 and 27 to the inner surface 21a, and ensures that the main section 41 passes through the gap between the lower end portion of the routing member bundle 31 and the guiding inner surface 21b upon fastening of the routing member bundle 31 by the binding member 4. The worker can easily fasten the routing member bundle 31 to the protector 1A by using the binding member 4 without reducing the work performance. The first end portions of the pair of protruding portions 26 and 27 located in the run-through direction protrude upward beyond the second end portions located in the counter-run-through direction. This configuration can prevent the routing member bundle 32 that is in contact with the inner surface 21a from moving up to the pair of protruding portions 26 and 27. This ensures that the routing member bundles 31 and 32 are spaced apart in the width direction, and the binding member 4 can fasten the routing member bundle 31 to the protector 1A in this state.

In the embodiment above, the guiding inner surface 21b is raised upward toward the run-through direction, and thus can guide the pointed tip 41a of the main section 41 in the upward direction after the pointed tip 41a passes through the gap between the lower end portion of the routing member bundle 31 and the guiding inner surface 21b. This configuration can prevent the pointed tip 41a from being caught in the routing member bundle 32 that is in contact with the inner surface 21a. The pointed tip 41a is directed upward, and thus the worker can hold the main section 41 more easily than in a case in which the pointed tip 41a directs sideward.

In the embodiment above, the upper end portions 26a and 27a of the pair of protruding portions 26 and 27 have a curved shape curving downward. This configuration can prevent the routing member bundle 31 placed on the pair of protruding portions 26 and 27 from moving in the width direction. This ensures that the main section 41 passes through the gap between the lower end portion of the routing member bundle 31 and the guiding inner surface 21b. The worker can easily fasten the routing member bundle 31 to the protector 1A by using the binding member 4 without reducing the work performance.

As described above, in the wire harness 100 according to the embodiment, a part of a plurality of routing members 3 can be fastened while putting the routing members in position, and thus the protector 1A can have a smaller configuration with the routing members 3 routed therein.

Figure 5:
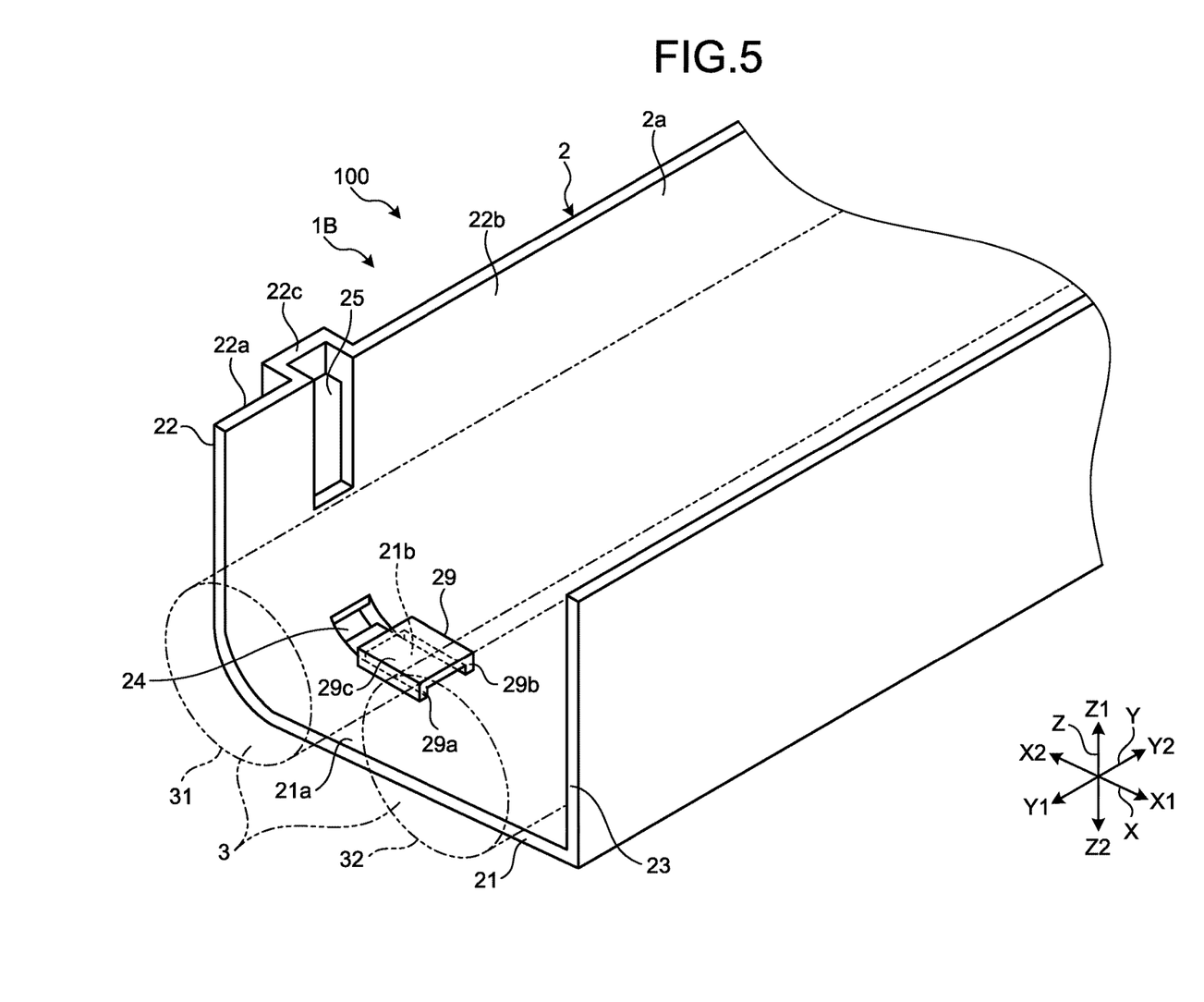
FIG. 5 is a perspective view illustrating a protector of a wire harness according to a modification of the embodiment.

In the embodiment above, the pair of protruding portions 26 and 27 are configured as separate parts, but are not limited to this as long as the pair of protruding portions 26 and 27 can place the routing member bundle 31 thereon. FIG. 5 is a perspective view illustrating a protector of a wire harness according to a modification of the embodiment. As illustrated in FIG. 5, this protector 1B according to the modification may include a pair of protruding portions 29a and 29b arranged in the width direction. The protector 1B according to the modification includes a placing stand 29 placed on the inner surface 21a. The placing stand 29 is used to place the routing member bundle 31 thereon and includes the pair of protruding portions 29a and 29b and a placing surface 29c. The pair of protruding portions 29a and 29b protrude upward from the inner surface 21a of the bottom plate 21. When seen in the run-through direction of the first through-hole 24, the pair of protruding portions 29a and 29b are arranged in an extending direction or the width direction with the first through-hole 24 interposed therebetween. The pair of protruding portions 29a and 29b according to the modification arranged on the bottom plate 21 are spaced apart in the extending direction by a distance greater than the width of the main section 41 of the binding member 4. Upper end portions of the pair of protruding portions 29a and 29b are connected by the placing surface 29c in the extending direction. The placing surface 29c is used to place the routing member bundle 31 thereon and is configured by the upper end portions of the pair of protruding portions 29a and 29b.

When the worker fastens the routing member bundle 31 to the protector 1B by using the binding member 4, the worker arranges in the inner space 2a, the routing members 3 that are separated into the routing member bundles 31 and 32, and places a part of the routing member bundle 31 on the placing stand 29 with the lower end portion of the routing member bundle 31 being in contact with the placing surface 29c. The worker then inserts the main section 41 of the binding member 4 that is inserted through the first through-hole 24 into the inside of the placing stand 29 along the guiding inner surface 21b, and the main section 41 is exposed from an end of the placing stand 29 located in the run-through direction. A gap is formed between the guiding inner surface 21b and the placing stand 29, that is, between the guiding inner surface 21b and a surface opposite to the placing surface 29c in the up-and-down direction, and this gap allows the pointed tip 41a moving along the guiding inner surface 21b to pass through between the lower end portion of the routing member bundle 31 and the guiding inner surface 21b. The worker holds then the main section 41 exposed from the end of the placing stand and pulls it and inserts it into the second through-hole 25 and then into the locking section 42. The binding member 4 fastens the routing member bundle 31 to the protector 1B with the routing member bundle 31 being in contact with the side wall 22 and spaced apart from the routing member bundle 32 in the width direction.

Figure 6:
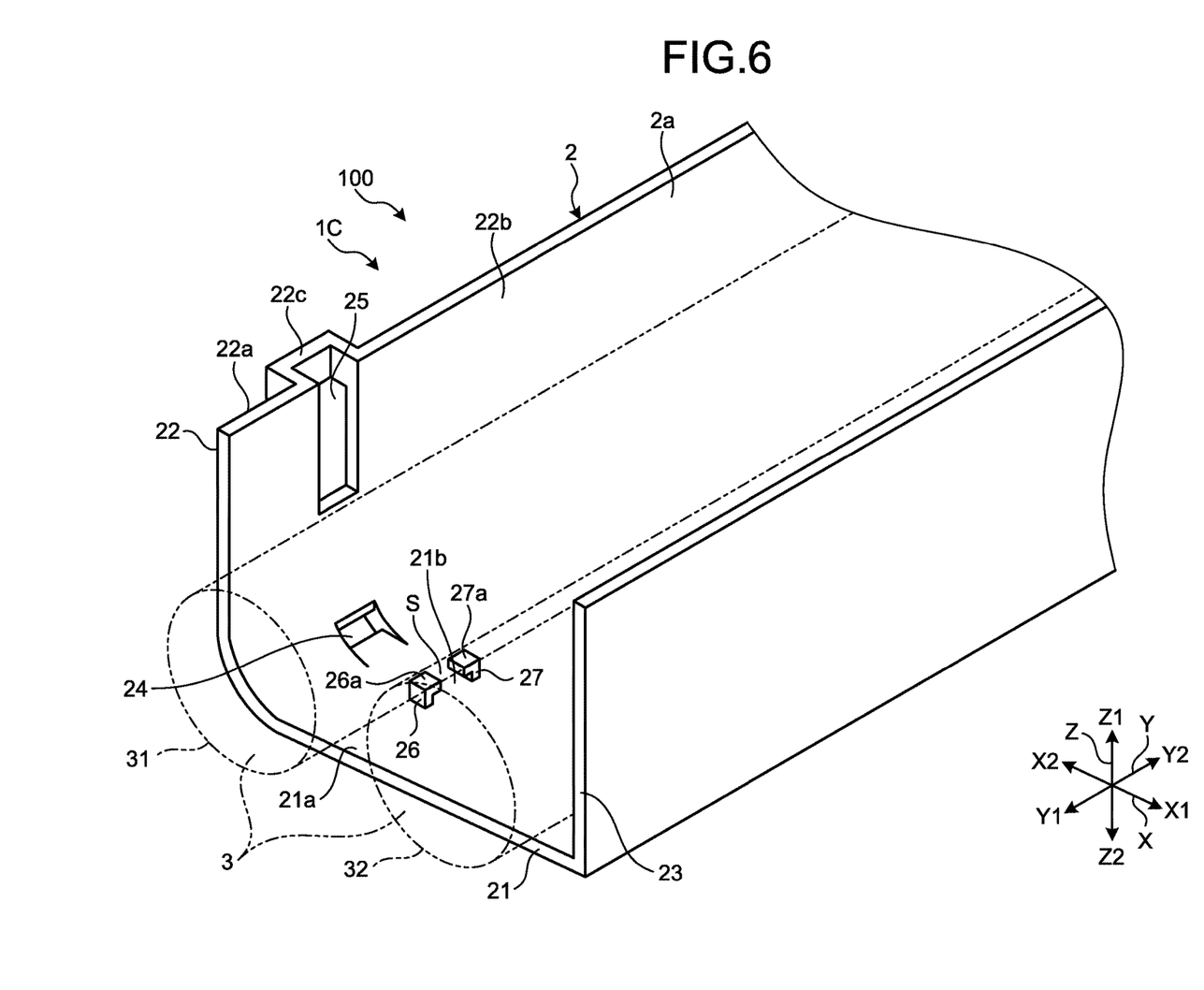
FIG. 6 is a perspective view illustrating a protector of a wire harness according to another modification of the embodiment.

In the embodiment and modification above, first, a plurality of routing members 3 are routed in the inner space 2a, and then the main section 41 of the binding member 4 is inserted into the first through-hole 24 and passes through between the pair of protruding portions 26 and 27, or 29a and 29b, but the embodiment and modification above are not limited to this. For example, first, the main section 41 of the binding member 4 may be inserted into the first through-hole 24 and pass through between the pair of protruding portions 26 and 27 or 29a and 29b, and then the routing members 3 may be routed in the inner space 2a. Furthermore, the main section 41 located between the pair of protruding portions 26 and 27 may be prevented from removing or slipping out from the pair of protruding portions 26 and 27 before the routing members 3 are routed in the inner space 2a. FIG. 6 is a perspective view illustrating a protector of a wire harness according to another modification of the embodiment. As illustrated in FIG. 6, this protector 1C according to the other modification may have upper end portions 26a and 27a of the pair of protruding portions 26 and 27 that extend to come closer to each other in an extending direction or the width direction. The upper end portions 26a and 27a are spaced apart in the extending direction by a gap S set to be narrower than the width of the main section 41 of the binding member 4.

When the worker fastens the routing member bundle 31 to the protector 1C by using the binding member 4, the worker inserts the main section 41 of the binding member 4 into the first through-hole 24, causes the main section 41 to pass through between the pair of protruding portions 26 and 27 along the guiding inner surface 21b, and exposes the main section 41 from an end of the pair of protruding portions 26 and 27 located in the run-through direction. The worker then arranges, in the inner space 2a, the routing members 3 that are separated into the routing member bundles 31 and 32, and places part of the routing member bundle 31 on the main section 41 or on the pair of protruding portions 26 and 27 with the lower end portion of the routing member bundle 31 being in contact with the main section 41 located on the inner surface 21a or in contact with the upper end portions 26a and 27a of the pair of protruding portions 26 and 27. The worker then holds the pointed tip 41a of the main section 41 and pulls it upward. When the worker pulls the main section 41 upward, part of the main section 41 located between the pair of protruding portions 26 and 27 passes through the gap S and is released from the pair of protruding portions 26 and 27 by being elastically deformed or twisted, for example. The worker then inserts the main section 41 into the second through-hole 25, and then into the locking section 42, whereby the binding member 4 fastens the routing member bundle 31 to the protector 1C with the routing member bundle 31 being in contact with the side wall 22 and spaced apart from the routing member bundle 32 in the width direction.

In the protector and the wire harness according to the present embodiment and modifications, part of the routing members are kept out of contact with the bottom surface by a pair of protruding portions before being fastened by a binding member. This configuration allows the binding member inserted into the first through-hole in the run-through direction to pass through between the part of the routing members and the bottom surface, and the binding member is not disposed outside the bottom plate. With this configuration, the part of the routing members can be fastened while being positioned by the pair of protruding portions and the protector can have a smaller configuration with the routing members routed therein.

Although the invention has been described with respect to the specific embodiment and the modifications for a complete and clear disclosure, the appended claims are not to be thus limited but are to be construed as embodying all modifications and alternative constructions that may occur to one skilled in the art that fairly fall within the basic teaching herein set forth.

What is claimed is:

1. A protector comprising:
a bottom plate;
a pair of side walls that stand on the bottom plate; and
an inner space that is defined by at least the bottom plate and the pair of side walls, and in which a plurality of routing members are routed, wherein
one side wall of the pair of side walls has a first through-hole and a second through-hole that run through the side wall from an outside to the inner space, and a binding member that fastens at least a part of the routing members to the one side wall is inserted into the first and second through-holes,
the first through-hole is formed as a window surrounded on all sides by the one side wall and the bottom plate, and continuously with an inner surface of the bottom plate, close to the inner space,
the second through-hole is formed as a window surrounded on all sides by the one side wall to be spaced apart from the first through-hole in a standing direction,
the bottom plate includes a connecting portion that connects a pair of protruding portions, the connecting portion protruding upward from the bottom plate, the pair of protruding portions formed to protrude in the standing direction from the inner surface, the pair of protruding portions, when seen in a run-through direction of the first through-hole, being spaced apart in a direction orthogonal to the standing direction and the run-through direction with the first through-hole interposed between the pair of protruding portions, the pair of protruding portions are formed, on the inner surface, close to the one side wall in the run-through direction, and
the pair of protruding portions gradually increasing from a first end at the one side wall to a second end connected to the connecting portion.

2. The protector according to claim 1, wherein
the end portion in the run-through direction protruding in the standing direction beyond the end portion in the opposite direction, the end portion in the opposite direction being connected to the one side wall.

3. The protector according to claim 1, wherein
the connecting portion is provided to protrude from the inner surface in the standing direction, the connecting portion connecting end portions of the pair of protruding portions located in the run-through direction, and
the inner surface has a guiding inner surface between the pair of protruding portions, the guiding inner surface being configured to protrude in the standing direction toward the run-through direction.

4. The protector according to claim 2, wherein
the connecting portion is provided to protrude from the inner surface in the standing direction, the connecting portion connecting the end portions of the pair of protruding portions located in the run-through direction, and
the inner surface has a guiding inner surface between the pair of protruding portions, the guiding inner surface being configured to protrude in the standing direction toward the run-through direction.

5. The protector according to claim 1, wherein
the pair of protruding portions are formed with a space therebetween continuous with the first through-hole and separating the pair of protruding portions from each other.

6. A wire harness comprising:
a plurality of routing members; and
a protector including a bottom plate, a pair of side walls standing on the bottom plate, and an inner space defined by at least the bottom plate and the pair of side walls, and in which the routing members are routed, wherein
in the protector, one side wall of the pair of side walls has a first through-hole and a second through-hole that run through the side wall from outside to the inner space, and into the first and second through-holes a binding member that fastens at least a part of the routing members to the side wall is inserted,
the first through-hole is formed as a window surrounded on all sides by the one side wall and the bottom plate, and continuously with an inner surface of the bottom plate, close to the inner space,
the second through-hole is formed as a window surrounded on all sides by the one side wall to be spaced apart from the first through-hole in a standing direction, and
the bottom plate includes a connecting portion that connects a pair of protruding portions, the connecting portion protruding upward from the bottom plate, the pair of protruding portions formed to protrude in the standing direction from the inner surface, the pair of protruding portions, when seen in a run-through direction of the first through-hole, being spaced apart in a direction orthogonal to the standing direction and the run-through direction with the first through-hole interposed between the pair of protruding portions, and the pair of protruding portions gradually increasing from a first end at the one side wall to a second end connected to the connecting portion.

7. The wire harness according to claim 6, wherein the pair of protruding portions are formed with a space therebetween continuous with the first through-hole and separating the pair of protruding portions from each other.

* * * * *